United States Patent [19]

Kato

[11] Patent Number: 5,128,839
[45] Date of Patent: Jul. 7, 1992

[54] LIGHTING DEVICE FOR USE WITH VEHICLES

[75] Inventor: Akio Kato, Hadano, Japan

[73] Assignee: Ichikoh Industries Ltd., Tokyo, Japan

[21] Appl. No.: 302,958

[22] Filed: Jan. 30, 1989

[30] Foreign Application Priority Data

Jun. 30, 1988 [JP] Japan ............... 63-162980

[51] Int. Cl.⁵ ............... B60Q 1/26
[52] U.S. Cl. ............... 362/61; 362/268; 362/331; 362/333
[58] Field of Search ............... 362/61, 80, 293, 331, 362/268, 333

[56] References Cited

U.S. PATENT DOCUMENTS

| | | | |
|---|---|---|---|
| 4,241,388 | 12/1980 | Green | 362/268 |
| 4,532,578 | 7/1985 | Gaden et al. | 362/80 |
| 4,670,823 | 6/1987 | Kochi et al. | 362/331 X |
| 4,680,680 | 7/1987 | Iwaki et al. | 362/268 |
| 4,727,458 | 2/1988 | Droste et al. | 362/61 |
| 4,796,165 | 1/1989 | Metti | 362/61 X |
| 4,816,968 | 3/1989 | Yamada et al. | 362/268 |
| 4,835,666 | 5/1989 | Feger et al. | 362/268 |
| 4,855,877 | 8/1989 | Otaka | 362/61 |
| 4,860,174 | 8/1989 | Kato et al. | 362/61 |

Primary Examiner—Ira S. Lazarus
Assistant Examiner—Sue Hagarman
Attorney, Agent, or Firm—Foley & Lardner

[57] ABSTRACT

A lighting device for use with vehicles comprises an outer lens attached to the front opening of a housing, an inner lens located inside the outer lens at the front opening of the housing, and a transparent sheet interposed between the outer and inner lenses and smoke-treated on its outer surface. The device further comprises light sources located inside the inner lens, engaging pins made integral to the outer or inner lens, and engaged holes formed in the transparent sheet and engaged with the engaging pins of the outer or inner lens.

23 Claims, 19 Drawing Sheets

FIG. 9
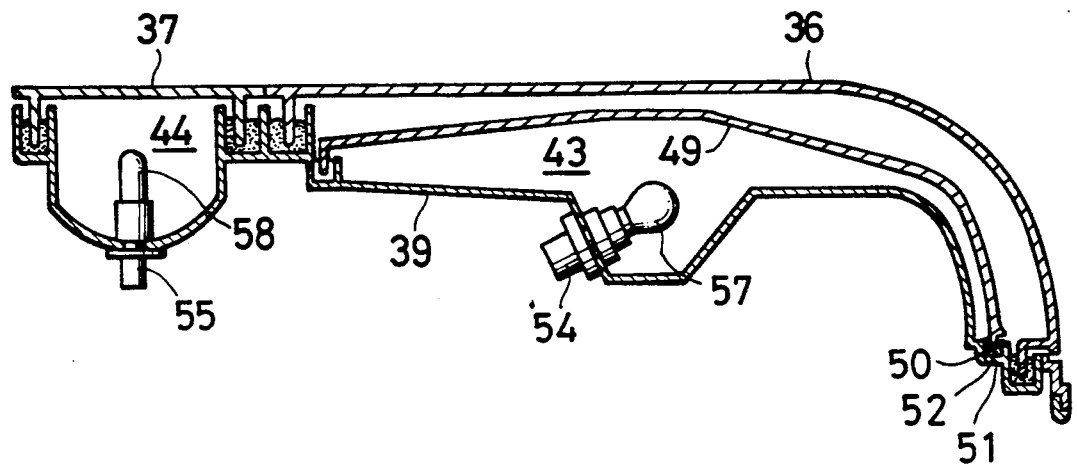
FIG. 10   FIG. 11
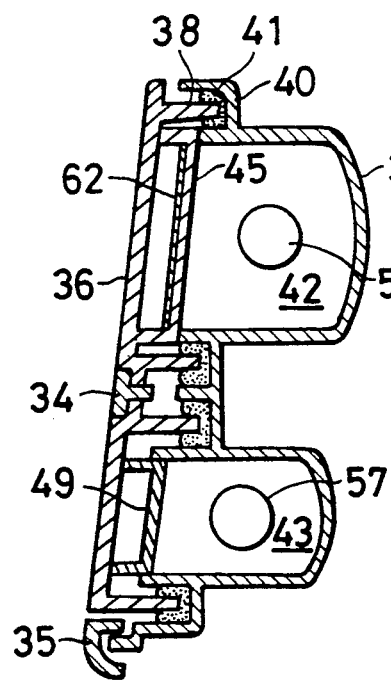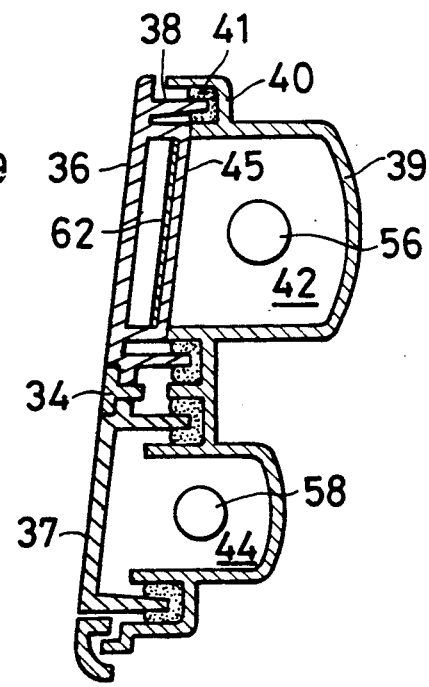

LIGHTING DEVICE FOR USE WITH VEHICLES

BACKGROUND OF THE INVENTION

1. Field of the Invention

The present invention relates to a lighting device such as the combination lamp provided with a lens longer in the horizontal direction thereof and attached as a part to form the exterior of vehicles.

2. Description of the Prior Art

In the case of the rear combination lamp having a lens longer in the horizontal direction thereof, for example, the tail stop lamp which emits red light, the turn signal lamp which emits orange light, and the backup lamp which emits white light are combined with one another to form the rear combination lamp or lighting device. The tail stop lamp is a combination of the tail lamp which informs persons behind of the presence of a vehicle at night and the stop lamp which emits light when the vehicle is braked. The turn signal lamp serves to tell the change of that lane on which the vehicle is running and the backup lamp serves to illuminate behind and tell that the vehicle is to move backward.

In the case of this lighting device, however, there arises the problem of false lighting. This is a phenomenon seen in the daytime when sun light enters into the lighting device and reflected by the prism on the backside of the lens or reflector in the lighting device. The lighting device is seen at this time as if it were lit. This phenomenon is also sometimes seen at night when the lighting device is illuminated by headlamps of other vehicles.

When this false lighting is seen at the tail stop lamp, for example, there is a danger that the vehicle behind puts on an emergency brake, with the driven thinking that the preceding vehicle had been braked, to thereby make persons travelling in the following vehicle to fear a collision. This sudden braking can also cause the vehicle to be hit from behind.

In order to prevent this false lighting, plural stripes which serve to shield light entering into the lighting device from outside are arranged on the front or back of the lens in the horizontal direction thereof, but these light shielding stripes uniformly formed on the whole front or back surface of the lens reduce the light distributing capacity of the lighting device.

When the light shielding stripes are to be formed directly on the front or back of the lens, as described above, it is necessary that every lens be processed to have these light shielding stripes thereon. This takes time and makes the cost high.

Further, a trend has arisen these days that the lighting devices are made as thin as possible. When made so thin, the lighting devices can become lighter in weight and lower in material cost. In the case where the rear combination lamp is made so thin according to this trend, the trunk room can have a larger volume. When the lighting devices are made thin like this, however, they can look not three-dimensional but flat and this gives no satisfied feeling to persons who see them from their lens side. This also cannot satisfy those persons who want to possess products of high grade.

The applicant of the present invention has proposed in Japanese Patent Application No. 62-93290 a technique in which a transparent sheet is bonded to the surface of an inner lens and in which graduations are applied to the transparent sheet to let the lamp have three-dimensional appearance even when it is made thin. This technique enables the false lighting to be prevented without any process added to the lens.

In the case where the transparent sheet is bonded to the surface of the inner lens, however, the sun light entering into the lighting device from outside may be reflected by the surface of the transparent sheet because this sheet is usually made of synthetic resin and has a brilliant surface. When the sheet is even a little swelled, therefore, the sun light reflected looks like a striped pattern, thereby making it difficult to recognize the lighting device itself.

Although the above-mentioned Japanese Patent Application No. 62-93290 does not disclose a concrete technique of bonding the transparent sheet to the surface of the inner lens, it is preferable that the bonding process can be achieved reliably, easily and quickly.

SUMMARY OF THE INVENTION

The object of the present invention is to provide a lighting device for use with vehicles manufactured with easiness, but having an excellent design and preventing the false lighting without reducing its light distributing capacity.

According to a lighting device of the present invention, inner and outer lenses are attached to the front opening of a housing and a transparent sheet to which delustering treatment has been applied is bonded to the surface of the inner lens. The lighting device for use with vehicles can be manufactured at a low cost because the light shielding area can be formed only by bonding the transparent sheet to the inner lens without any process added to the inner lens itself.

Even when the sun light enters into the lighting device through the outer and inner lenses, it can be partly shielded because the transparent sheet is delustered. This can prevent the false lighting.

According to another lighting device of the present invention, one of the inner and outer lenses is provided with engaged pins while the transparent sheet is provided with engaging holes into which the engaged pins of the sheet are fixedly fitted. When the transparent sheet is attached like this to one of the inner and outer lenses, it can be easily and quickly attached to the lighting device without any parts needed for the transparent sheet.

The present invention will be described in detail with reference to the accompanying drawings.

BRIEF DESCRIPTION OF THE DRAWINGS

FIG. 9 is a sectional view taken along a line IX—IX in FIG. 7.

FIG. 10 is a sectional view taken along a line X—X in FIG. 7.

FIG. 11 is a sectional view taken along a line XI—XI in FIG. 7.

DETAILED DESCRIPTION OF THE PREFERRED EMBODIMENTS

Figure 1:
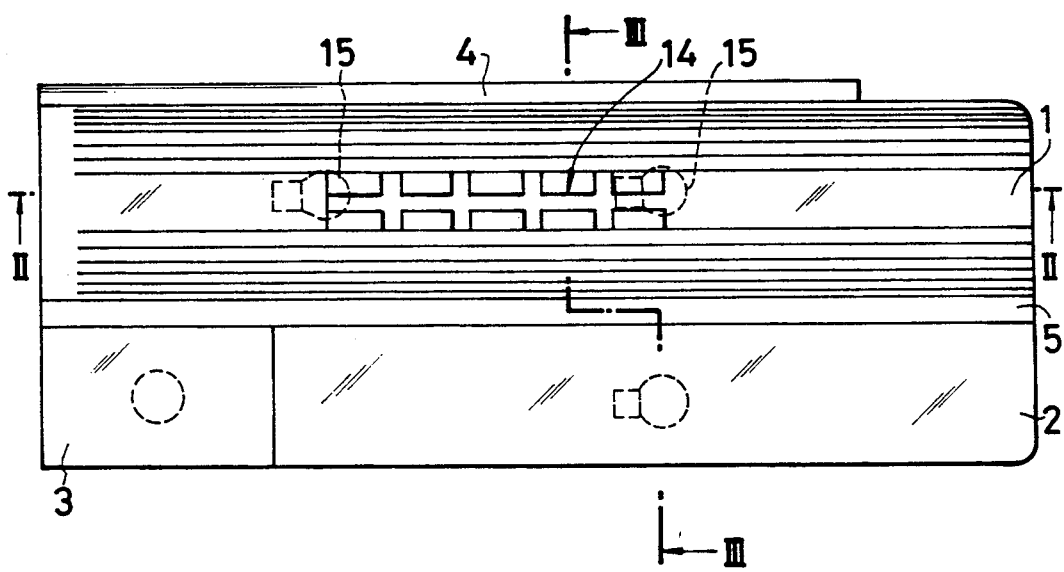
FIG. 1 is a front view showing a first example of the lighting device for use with vehicles according to the present invention.
Figure 2:
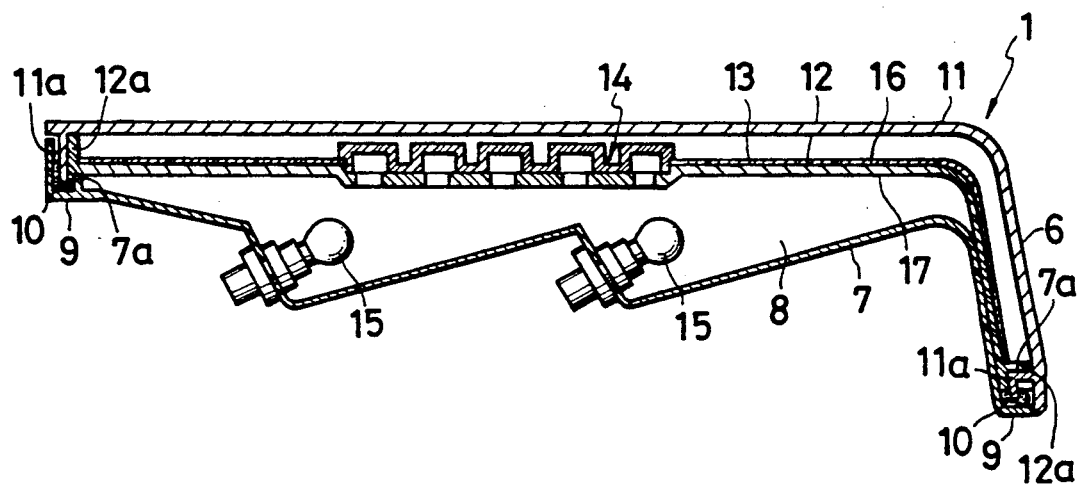
FIG. 2 is a sectional view taken along a line II—II in FIG. 1.
Figure 3:
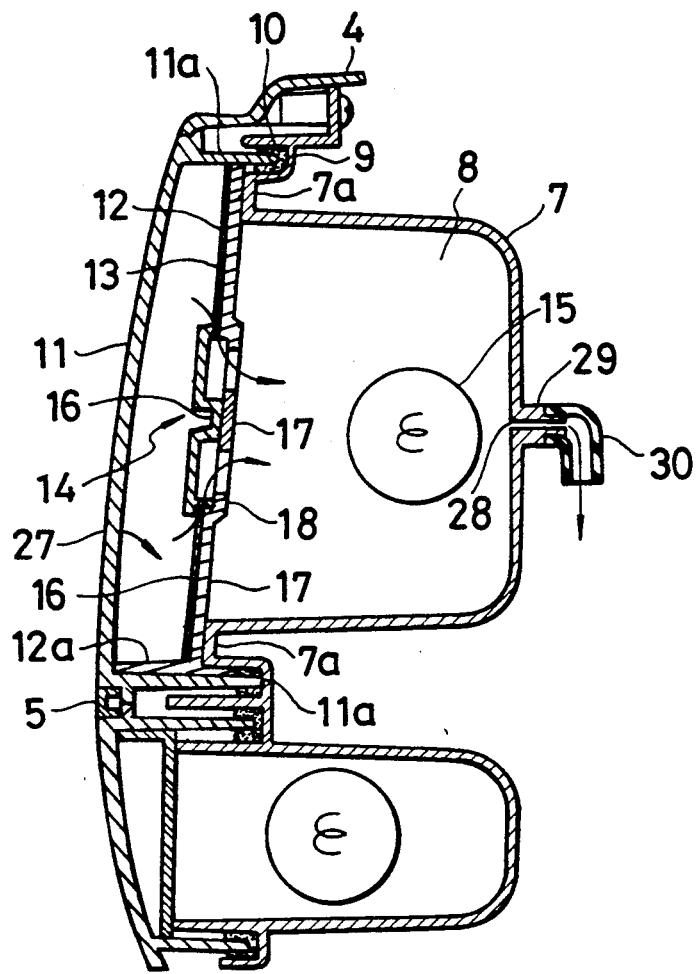
FIG. 3 is an enlarged sectional view taken along a line III—III in FIG. 1.
Figure 4:
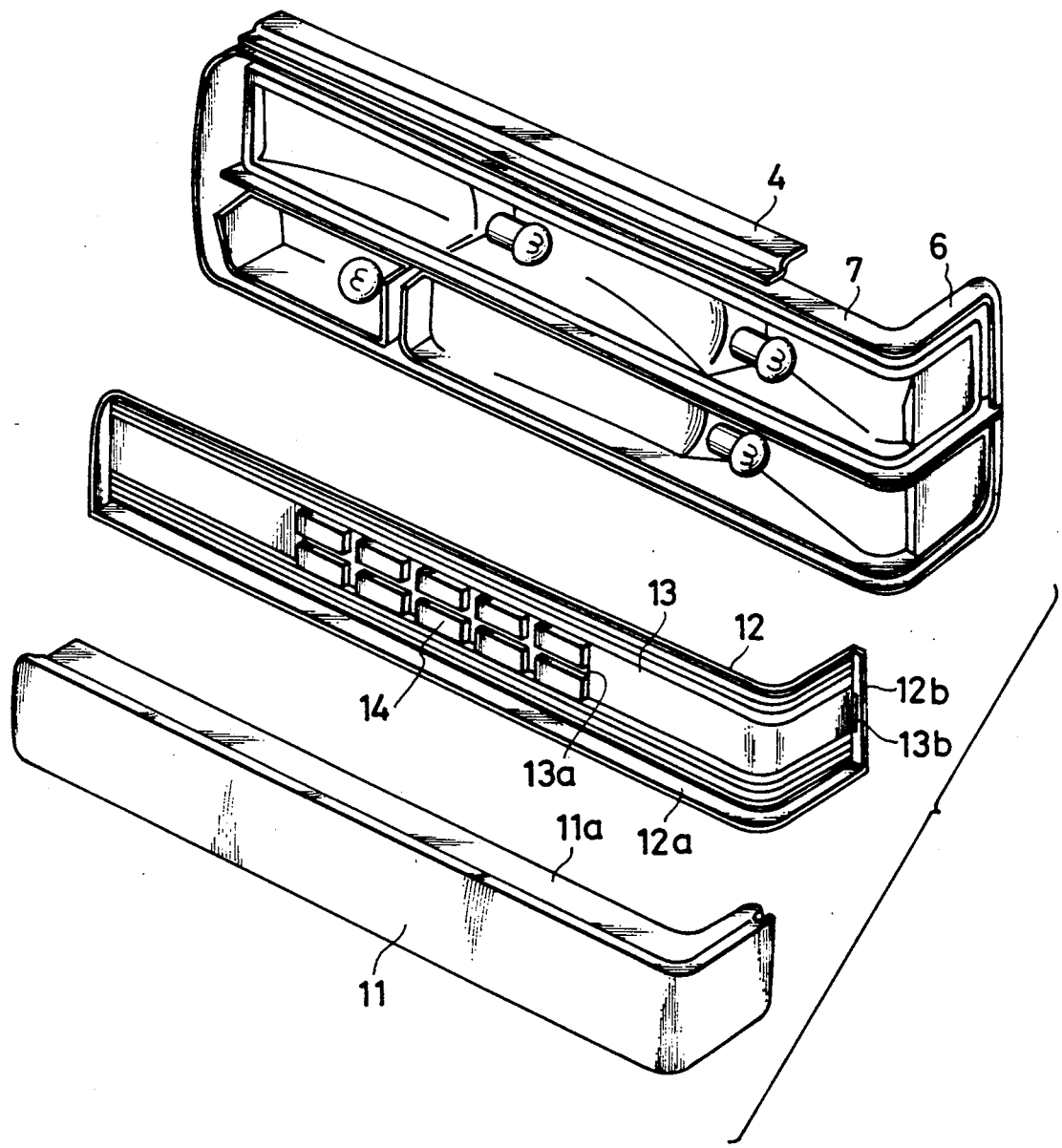
FIG. 4 is a perspective view showing the lighting device of FIG. 1 dismantled.

FIG. 1 is a front view showing an example of the lighting device for use with vehicles according to the present invention, FIG. 2 is a sectional view taken along a line II—II in FIG. 1, FIG. 3 is an enlarged sectional view taken along a line III—III in FIG. 1, and FIG. 4 is a perspective view showing the lighting device of FIG. 1 dismantled.

The lighting device is a rear combination lamp longer in the horizontal direction thereof. It comprises a red tail stop lamp 1 at its upper half, an orange turn signal lamp 2 at its lower and outer half, a white backup lamp 3 at its lower and inner half, a rim 4 on its top and a lace 5 arranged between the upper and lower halves. It is also provided with a portion 6 which is curved along the back corner of the vehicle. The present invention will be described referring to the tail stop lamp 1.

The tail stop lamp 1 includes an outer lens 11 whose legs 11a are embedded into hot melt 10 in a groove 9 formed along the front rim of a lamp chamber 8 in a common housing 7, an inner lens 12 arranged inside the outer lens 11 and sandwiched between the outer lens 11 and a flange 7a of the housing 7, a transparent sheet 13 bonded to the outer surface of the inner lens 12, a reflex reflector 14 connected to the outer surface of the inner lens 12, and two lamp bulbs 15 arranged in the lamp chamber 8.

The outer lens 11, about 3 mm thick, is made by injection-molding red transparent acryl resin. The inner lens 12 is made of colorless transparent acryl resin and has a flange 12a along the rim thereof but except along the upper rim thereof. The inner lens 12 is injection-molded, about 3 mm thick, and has a fish-eye prism 16 on the whole outer surface thereof and a Fresnel prism 17 on the whole inner surface thereof. The transparent sheet 13 has a rectangular hole 13a (FIG. 4) in the center thereof into which the reflex reflector 14 is inserted, and it is made flat and about 0.5 mm thick by press-molding polycarbonate resin. A graduation pattern is printed in black on the outer surface of the transparent sheet 13. After printing, the entire outer surface of the transparent sheet 13 is uniformly delustered as illustrated in FIG. 4 by an ink which is called LOV MAT-CLEAR made by Seiko Advance Corporation. This delustering treatment may be achieved using other solutions, paints or it may be carried out according to a liquid honing process.

The transparent sheet 13 is attached to the outer surface of the inner lens 12 in such a way that an L-shaped hook 13b (see FIG. 4) positioned at the end of that portion of the sheet 13 which corresponds to the curved portion 6 is inserted into a slit 12b of the inner lens 12 and that top and bottom rim portions of the transparent sheet 13 are ultrasonically deposited on the outer surface of the inner lens 12 through ultrasonic depositing beads arranged along top and bottom rim portions of the inner lens 12. The thin transparent sheet 13 is distorted at the surface thereof by pressure, heat, vibration and the like at the time of this ultrasonic deposition, but the surface of the sheet 13 is delustered. Even when light enters onto the sheet 13 from outside, therefore, it is diffused to make this distortion of the sheet surface unrecognized.

Figure 5:
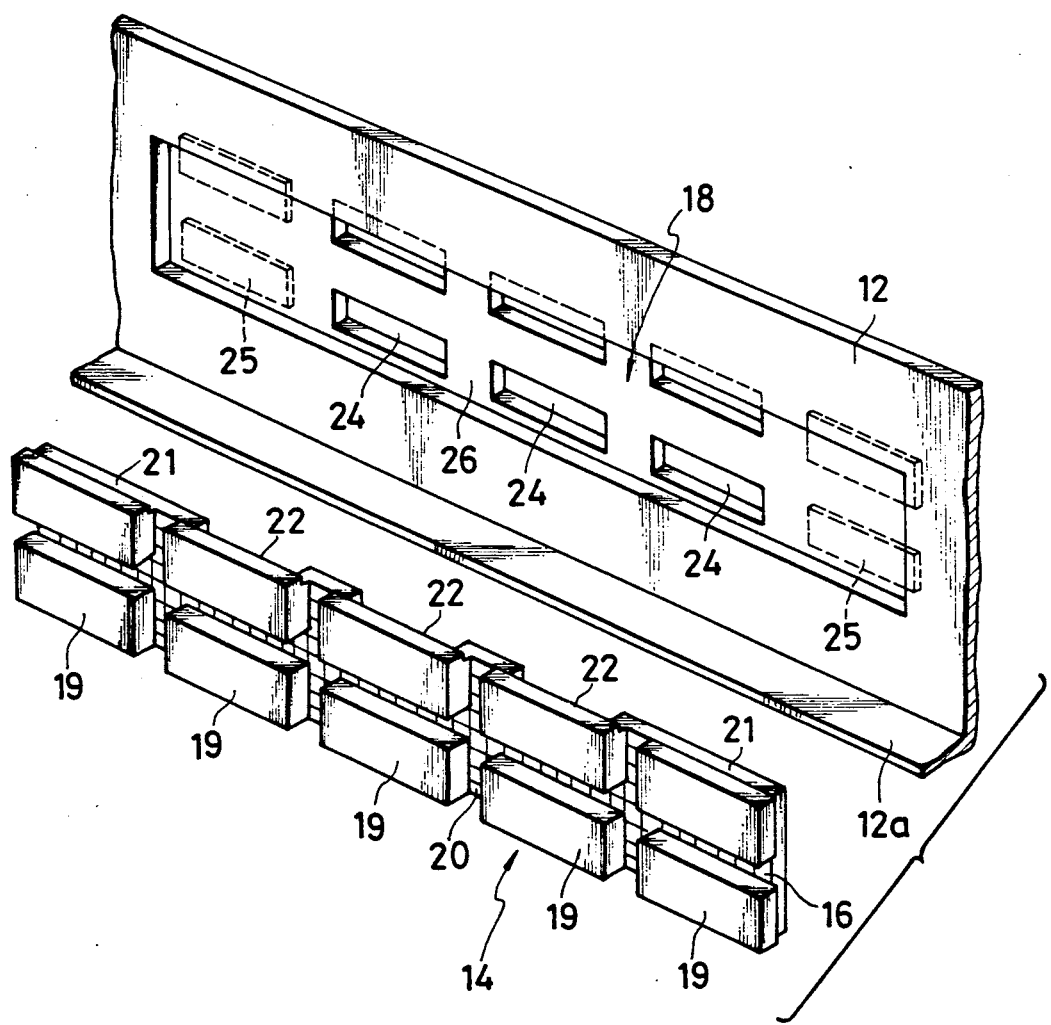
FIG. 5 is a perspective view showing an inner lens and a reflex reflector dismantled and viewed from their outer side.
Figure 6:
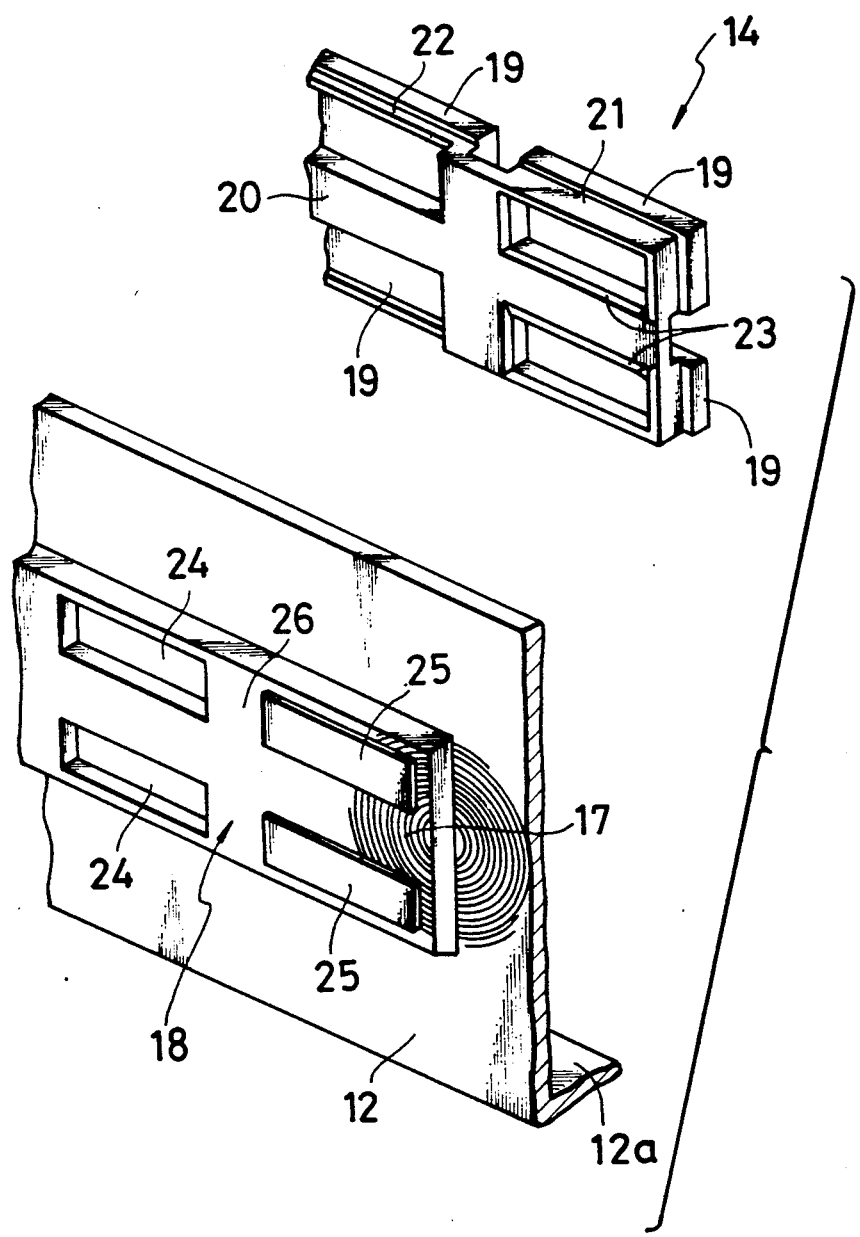
FIG. 6 is a perspective view showing the inner lens and the reflex reflector dismantled and viewed from their inner side.
Figure 7:
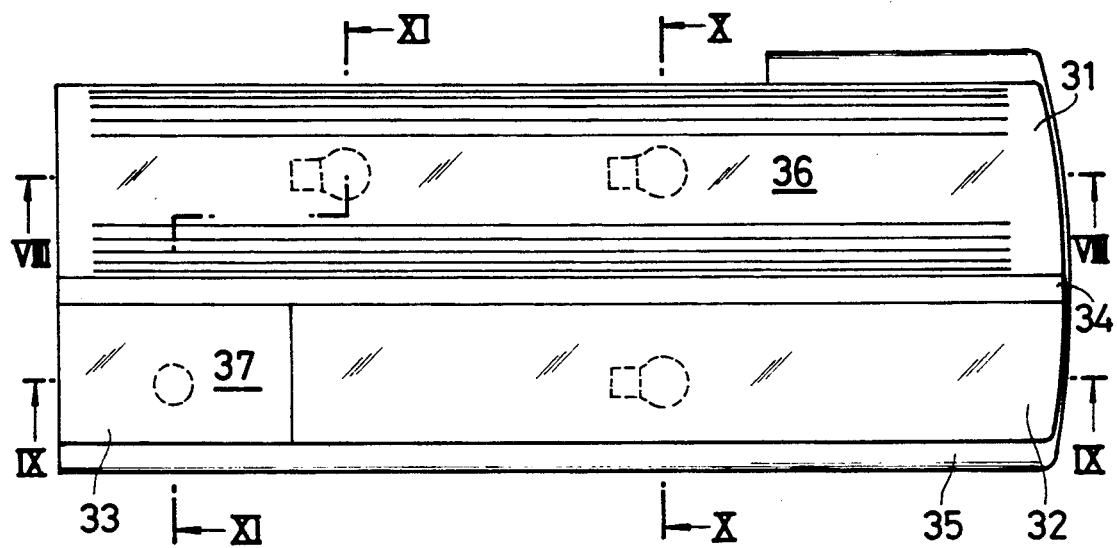
FIG. 7 is a front view showing a lighting device for use with vehicles which is disclosed in a preceding and pending patent application filed by the applicant of the present invention.

The inner lens 12 is provided with a rectangular recess 18 in the center thereof into which the reflex reflector 14 is fitted, as shown in FIG. 5 in which the inner lens 12 is viewed from the outer side thereof and in FIG. 6 in which the inner lens 12 is viewed from the inner side thereof. The reflex reflector 14 includes a frame 20 which serves as a light transmitting section, and two rows of element blocks 19 which are attached to the frame 20, each row having five element blocks 19, and these two rows being arranged on the reflex reflector 14 along the longitudinal direction thereof. A plurality of triangular pyramids are formed on the backside of each of the element blocks 19 and a fish-eye prism 16 is formed on the outer surface of the frame 20, as seen on the outer surface of the inner lens 12.

The reflex reflector 14 has leg portions 21 formed along the outer circumference of both ends of the frame 20. Each of the leg portions 21 extends from one end of the frame 20 by a distance which is equal to the length of one element block 19 and those sides of the frame 20 which correspond to six element blocks 19, except for four positioned on both ends of the frame 20 have no leg portion. An L-shaped bead 23 for ultrasonic deposition is formed along the inner rim of each of those element blocks 19 which are positioned on both ends of the frame 20.

The recess 18 of the inner lens 12 has such a size that enables the leg portions 21 of the reflex reflector 14 to be fitted into the recess 18. Six ventilation holes 24 are formed in the recess 18, corresponding to the six element blocks 19 except for four positioned on both ends of the frame 20, and seats 25 for receiving four element blocks 19 positioned on both ends of the frame 20 are projected by about 1 mm from the bottom of the recess 18 at both ends thereof. Each of the ventilation holes 24 and seats 25 is made rectangular, having such a size that enables each of them to be kept in the effective illuminating area of each of the element blocks 19. No fish-eye prism is formed on the outer surface of the recess 18, but a Fresnel prism 17 continuous from the one on the inner surface of the inner lens 12 is formed on the inner surface of the recess 18 except those portions thereof which correspond to the ventilation holes 24 and seats 25.

After the transparent sheet 13 is bonded to the inner lens 12, the inner lens 12 is mounted on a cradle of the ultrasonic welding machine, positioning its seats 25 on the cradle, and the reflex reflector 14 is fitted into the recess 18. The L-shaped beads 23 of the reflex reflector 14 are then pressed and vibrated by the hone tip of the ultrasonic welding machine to connect the reflex reflector 14 to the inner lens 12. The pressing force of the hone tip is received this time by the seats 25 which are projected from the inner side of the bottom of the recess 18, thereby preventing the Fresnel prism 17 from being smashed in the vicinity of the L-shaped beads 23.

The inner lens 12 to which the reflex reflector 14 has been welded in this manner is supported by the flange 7a of the housing 7 which is formed along the outer rim of the housing 7, and when the leg portion 11a of the outer lens 11 is embedded into the hot melt 10 in the groove 9 formed along the flange 7a of the housing 7, the inner lens 12 is sandwiched between the outer lens 11 and the flange 7a of the housing 7 with its flange 12a interposed between them.

When the reflex reflector is viewed from that side thereof which is provided with a plurality of triangular pyramids, the inside can be seen through it. When the inside of the reflex reflector 14 is seen through the outer lens 11, the circumferential rim of each of the ventilation holes 24 at the recess 18 looks like a black line. If these ventilation holes 24 are not provided at the bottom of the recess 18 and the Fresnel prism 17 continuous from the one on the inner side of the inner lens 12 is not formed on the inner side of the bottom of the recess 18 either, no problem is caused even when the inside of the reflex reflector can be seen through the outer lens 11. But if these ventilation holes and Fresnel prism are provided, the circumferential rim of each of the ventilation holes 24 looks blacker, because of the contrast between the holes and the prism, to thereby make the appearance of the lighting device unsatisfactory. In the case of this lighting device, however, the seats 25 having the same size and shape as those of the ventilation hole 24 and on which no Fresnel prism is formed are arranged at the bottom of the recess 18 with a same interval interposed relative to the ventilation holes 24. Therefore, the inside of the reflex reflector 14 can be seen through the seats 25 as if it were seen through the ventilation holes 24. This can prevent the lighting device from appearing undesirable.

When the lamp bulbs 15 are lit in this lighting device, the frame 20 of the reflex reflector 14 illuminates almost the same as the outer surface of the inner lens 12 because the Fresnel prism is formed on that portion 26 of the inner side of the recess 18 at which neither the ventilation hole nor the seat is formed, and because the fish-eye prism 16 is formed on the inner side of the frame 20 of the reflex reflector 14. The element blocks 19 appear in the illumination light emitted from the frame 20 and the inner lens 12 and this enables the tail stop lamp 1 to be larger-sized without losing its light distributing capacity. The element blocks 19 appearing like this in the illumination light cooperate with the graduation patterns to create a splendid beauty of light.

The leg portion 11a of the outer lens 11 is embedded into the hot melt 10 in the groove 9 of the housing 7 and a space 27 between the outer and inner lenses 11 and 12 can be thus sealed. However, the leg portion 21 is cut away at portions 22 of the circumferential rim of the reflex reflector 14 and the ventilation holes 24 are formed at the bottom of the recess 18 of the inner lens 12 into which the reflex reflector 14 is fitted. The space 27 between the inner and outer lenses is thus communicated with the lamp chamber 8 through these cut-away portions 22 and ventilation holes 24. Further, a boss 29 having a through-hole 28 is projected from that side of the housing 7 which faces these ventilation holes 24 at the recess 18, and a grommet 30 is attached to this boss 29. The space 27 is thus communicated with the outside through the lamp chamber 8 and the grommet 30. When the sun shines on the outer surface of this lighting device, leaving the curved portion 6 thereof in the shadow, therefore, air in the lamp chamber 8 and further outside the chamber 8 which is lower in temperature than that in the space 27 is introduced into the space 27 behind the sun-shining portion of the lighting device to reduce the temperature difference between air in the space 27 behind the sun-shining portion and in the space 27 at the curved portion 6 which is not shone by the sun, thereby preventing the curved portion 6 of the lighting device from becoming dim.

FIGS. 7 through 11 show a second example of the lighting device according to the present invention wherein a transparent sheet is attached to an inner lens as shown in FIGS. 12 through 17. This lighting device is constructed as a rear combination lamp longer in the horizontal direction thereof and having a tail stop lamp 31 at the upper portion thereof, a turn signal lamp 32 and a backup lamp 33 at the lower portion thereof, a lace 34 extending along a horizontal center line between the upper and lower portions of the rear combination lamp, and a rim 35 extending along the outer circumference of the rear combination lamp.

A front lens means comprises an outer colorless and transparent lens 36 common to the tail stop and turn signal lamps 31 and 32, and a colorless and transparent smoke-treated lens 37 connected integral to the outer lens 36 and intended for backup lamp 33. As shown in FIGS. 8 through 11, this front lens means is attached to a housing 39 in such a way that a leg 38 formed integral along the outer rim of the lens means is fixed in a groove 40 by a hot melt 41, said groove 40 being formed integral along the outer rim of the housing 39.

Figure 8:
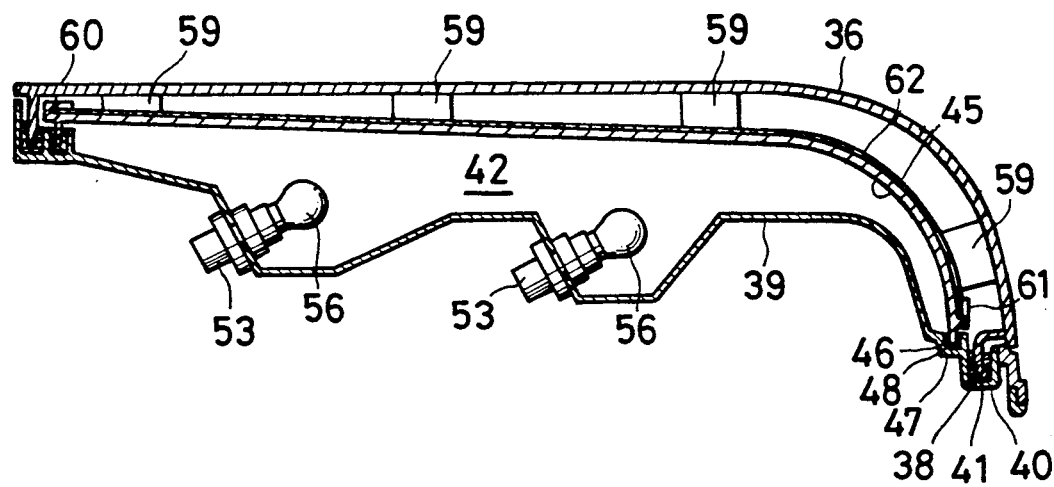
FIG. 8 is a sectional view taken along a line VIII—VIII in FIG. 7.

The housing 39 is partitioned into a chamber 42 for the tail stop lamp 31, a chamber 43 for the turn signal lamp 32 and a chamber 44 for the backup lamp 33. As shown in FIG. 8, an inner lens 45 which is red and transparent and which is provided with a fish-eye prism on its outer face and a Fresnel prism on its inner face is located in front of the tail stop lamp chamber 42 in such a way that its legs 46 formed at its both ends are fixed in inner grooves 47 of the housing 39 by a hot melt 48. As shown in FIG. 9, an inner lens 49 which is orange and transparent and which is provided with a fish-eye prism on its outer face and a Fresnel prism on its inner face is located in front of the turn signal lamp chamber 43 in such a way that its legs 50 at its both ends are fixed in inner grooves 51 of the housing 39 by a hot melt 52. No inner lens like this but an outer lens 37 is located in front of the backup lamp chamber 44. Sockets 53, 54 and 55 detachably attached to the housing 39 are located in the lamp chambers 42, 43 and 44, respectively, and lamp bulbs 56, 57 and 58 are screwed into the sockets 53, 54 and 55.

The inner lens 45 for the tail stop lamp is usually made as a plain plate (the prisms on its outer and inner faces are not shown) and is provided with guide projections 59 formed integral on its outer face along its both sides and with engaging claws 60 and 61 formed integral on its outer face at its both ends. A transparent sheet 62 on which a graduation pattern is printed is placed on the outer face of the inner lens 45 in such a way that cut-away portions at both ends of the transparent sheet 62 are engaged with the engaging claws 60 and 61 of the inner lens 45. The graduation pattern becomes lower and lower in its density as it comes from the top and bottom ends of the sheet 62 nearer to the center thereof. The inner lens 45 thus engaged with the sheet 62 is curved inward and fixed in the inner grooves 47 of the housing 39 and the outer lens 36 is then fixed in the outer groove 40 of the housing 39, as shown in FIG. 8. When arranged like this, the guide projections 59 of the inner lens 45 are resiliently contacted with the inner face of the outer lens 36 to keep the inner lens 45 curved. The outer lens 36 is previously curved to correspond to the inner lens 45 which is to be curved later.

Figure 12:
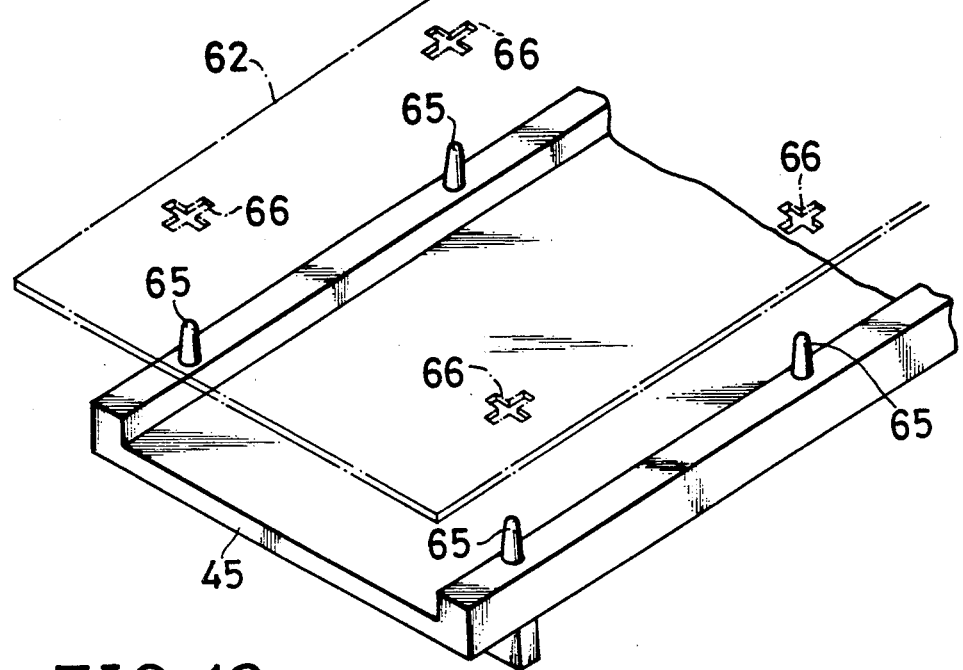
FIG. 12 is a perspective view showing a second example of the lighting device for use with vehicles according to the present invention in which an improvement is added to the system of attaching a transparent sheet to a lens.
Figure 13:
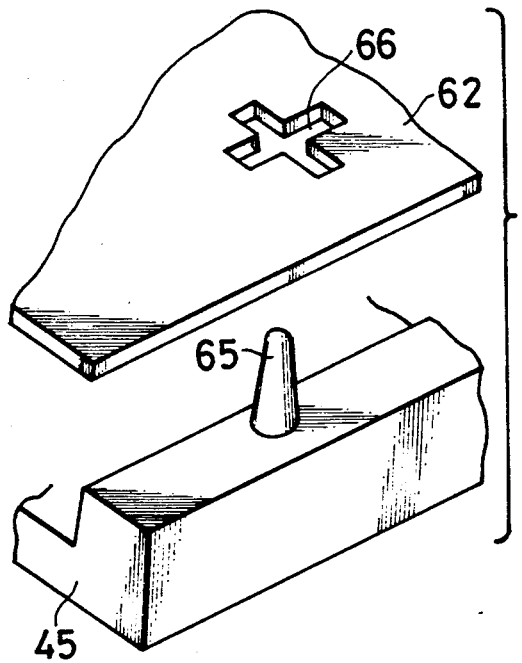
FIG. 13 is an enlarged view showing how the transparent sheet is attached to the lens.
Figure 14:
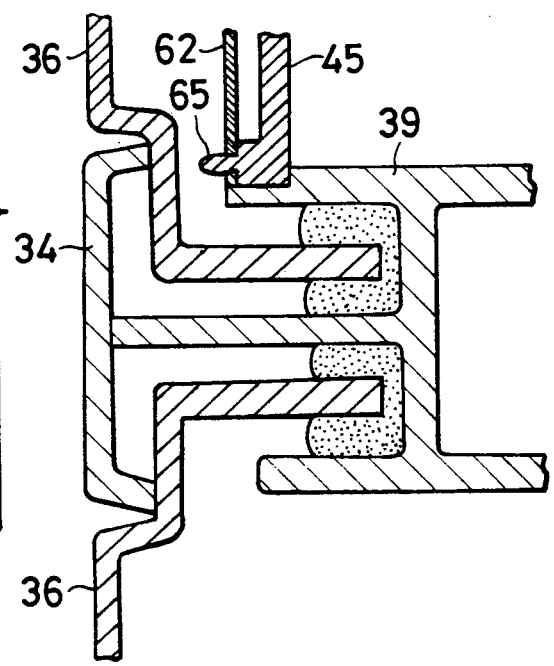
FIG. 14 is a sectional view showing a part of the second lighting device for use with vehicles.

The decorative transparent sheet 62 on which the graduation pattern has been printed is attached to the inner lens 45 in the case of the second embodiment of the present invention shown in FIG. 12. More concretely, the inner lens 45, plain and rectangular, is provided with plural engaging pins 65 formed at a certain interval on both sides of the lens 45 in the longitudinal direction thereof, as shown in FIGS. 12 through 14. The transparent sheet 62 is also provided with engaged holes 66 at those positions of the sheet 62 which correspond to the engaging pins 65 of the inner lens 45. When the engaging pins 65 of the inner lens 45 are fitted into the engaged holes 66 of the sheet 62, the sheet 62 is fixed to the inner lens 45. Each of the engaged holes 66 is cut therefore like a cross so as to reliably hold the engaging pin 65.

Figure 15:
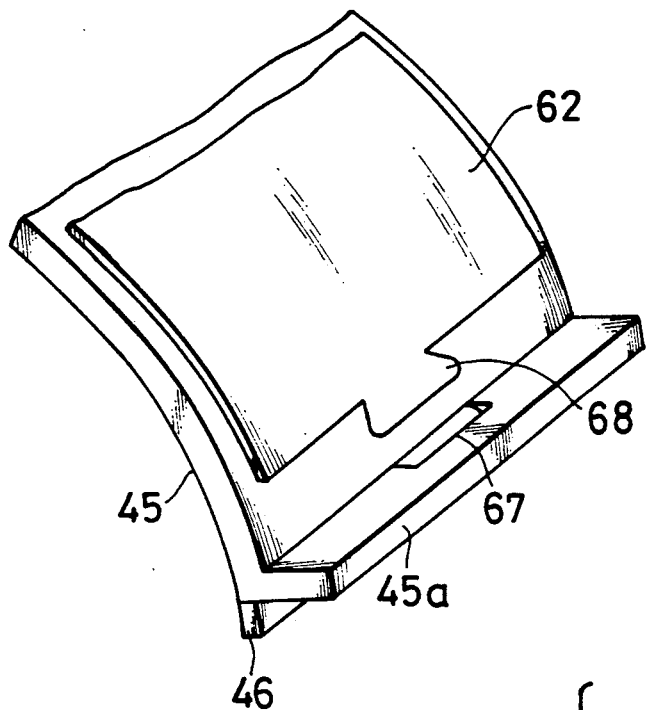
FIG. 15 is a perspective view showing a part of the inner lens and the transparent sheet employed by the second lighting device of the present invention.
Figure 16:
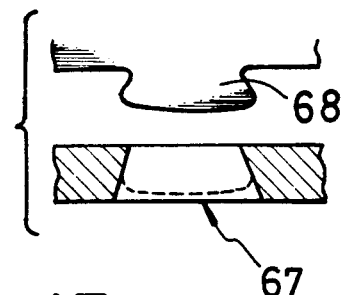
FIG. 16 is a sectional view showing how the transparent sheet in FIG. 15 is attached to the inner lens.

When the inner lens 45 is attached to the housing 39 as shown in FIG. 8, the engaging pins 65 are present not at the curved portion of the inner lens 45 but at the straight portion thereof. The end of the curved portion of the inner lens 45 is provided with an erected portion 45a which has an engaged hole 67, as shown in FIG. 15. The engaged hole 67 becomes larger and larger as it comes nearer to its front end, as shown in FIG. 16. When an engaging projection 68 formed integral to the sheet 62 and shaped to meet the engaged hole 67 is fitted into the engaged hole 67, one end of the sheet 62 is attached to the inner lens not to shift in the longitudinal direction of the lens 45.

The decorative transparent sheet 62 arranged as described above can be simply and reliably attached to the inner lens 45 only by fitting the engaging pins 65 of the lens 45 into the engaged holes 66 of the sheet 62.

Although the decorative transparent sheet 62 has been attached to the inner lens 45 in this embodiment of the present invention, the sheet 62 may be attached to the inner face of the outer lens 36 because the sheet 62 can fulfill its function when it is interposed between the inner and outer lenses 45 and 36.

Although each of the engaged holes 66 has been cut like a cross, it may be cut like a star or a circle to tightly hold the base of the engaging pin 65.

Figure 17:
FIG. 17 is a plan showing a part of the transparent sheet employed by the second lighting device.

Although the graduation pattern has been printed on the decorative transparent sheet 62, letters or the like may be stamped, printed or embossed on the sheet 62, as shown in FIG. 17.

Figure 18:
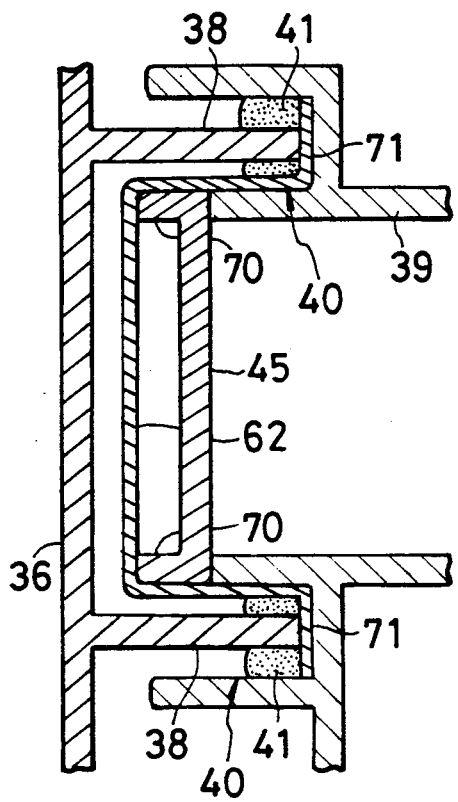
FIG. 18 is a sectional view showing the main portion of a third lighting device for use with vehicles according to the present invention.
Figure 19:
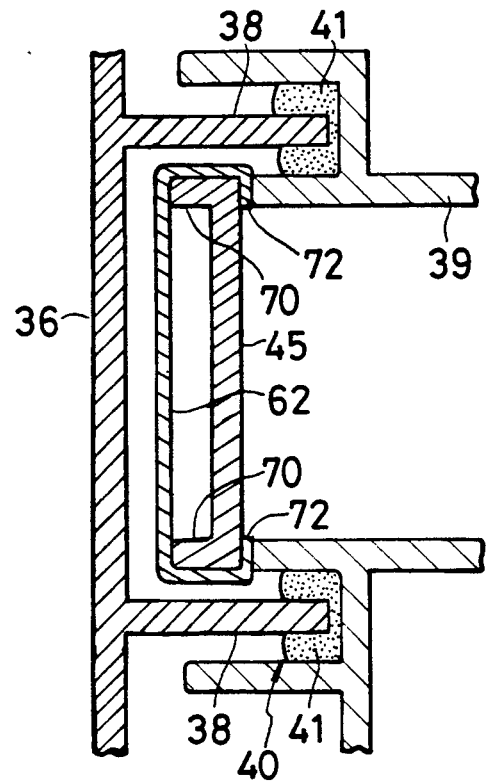
FIG. 19 is a sectional view showing that portion of the third lighting device where the transparent sheet has claws for supporting the inner lens.
Figure 20:
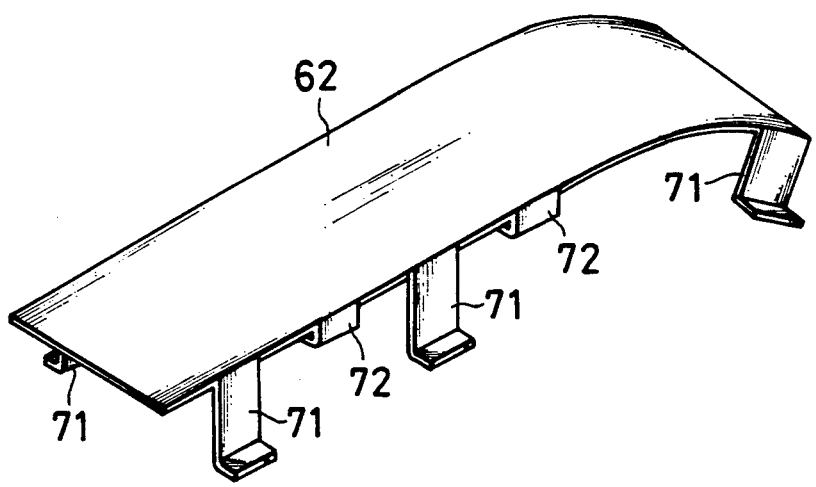
FIG. 20 is a perspective view showing a transparent sheet employed by the present invention.

FIGS. 18 through 20 show a third embodiment of the present invention wherein an improvement is made relating to the attaching of the transparent sheet to the inner lens. As shown in FIGS. 18 and 19, the housing 39 has the groove 40 along its rim and the leg 38 formed along the rim of the outer lens 36 is embedded into the hot melt 41 in the groove 40 of the housing 39.

The longitudinal both sides of the inner lens 45 are erected to form seats 70 and the decorative transparent sheet 62 on which the graduation pattern has been printed is bridged over these seats 70 of the inner lens 45 to cover the outer face of the lens 45.

As shown in FIG. 20, the decorative transparent sheet 62 is made plain and rectangular to meet the shape of the inner lens 45 and it has inner lens engaging legs 71 and inner lens supporting claws 72 along its both longitudinal sides. FIG. 20 shows the decorative transparent sheet 62 curved at its one end portion as if it were attached to the housing 39, but it is usually kept like a plate.

When the sheet 62 is bridged over the seats 70 of the inner lens 45, each of the inner lens engaging legs 71 is embedded into the hot melt 41 in the groove 40 of the housing 39, keeping its vertical portion contacted with the inner side of the groove 40 and its horizontal portion contacted with the bottom of the groove 40, as shown in FIG. 18. The legs 71 are fixed to the housing 39 by the hot melt 41 in the groove 40 of the housing 39 and by the legs 38 of the outer lens 36.

When the sheet 62 is bridged over the seats 70 of the inner lens 45, each of the inner lens supporting claws 72 is bent along the inner face of the inner lens 45, as shown in FIG. 19, to support the inner lens 45 from both sides thereof. Those portions of the housing 39 with which the inner lens supporting claws 72 are contacted are recessed so as not to separate the inner lens 45 from the housing 39.

When the inner lens 45 is attached to the housing 39 as shown in FIG. 8, the inner lens engaging legs 71 are present mainly along both sides of the straight portion of the sheet 62 but only at the end of the curved portion thereof. The sheet 62 is connected to the inner lens 45, as shown in FIG. 15.

In the case of the lighting device for use with vehicles having the above-described arrangement, two lenses 36 and 45 and the sheet 62 are assembled with one another in such a way that the engaging projection 68 of the decorative transparent sheet 62 is fitted into the engaged hole 67 of the inner lens 45 while the inner lens 45 is supported from both sides thereof by the inner lens supporting claws 72 and that the inner lens engaging legs 71 are then inserted into the grooves 40 of the housing 39, the hot melt 41 is injected into the grooves 40 and the legs 38 of the outer lens 36 are embedded into the hot melt 41.

The inner lens 45 can be thus attached to the housing 39 without using any hot melt, thereby enabling the attaching of the inner lens 45 to the housing 39 to be made extremely simple.

The hot melt 41 into which the legs 38 of the outer lens 36 are embedded is covered by a decorative member such as the lace and cannot be seen from outside.

Figure 21:
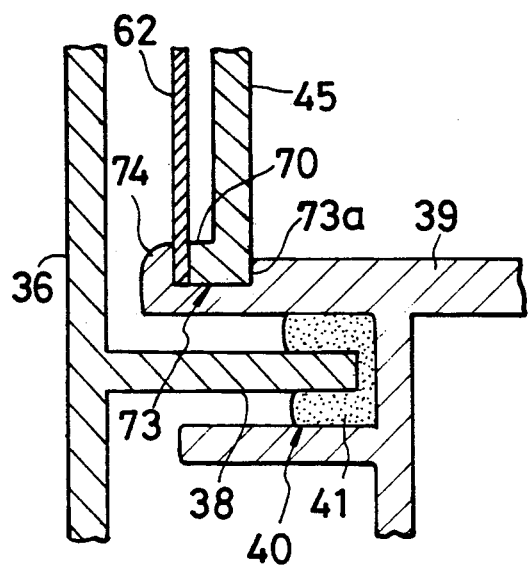
FIG. 21 is a sectional view showing the main portion of a fourth lighting device for use with vehicles according to the present invention.
Figure 22:
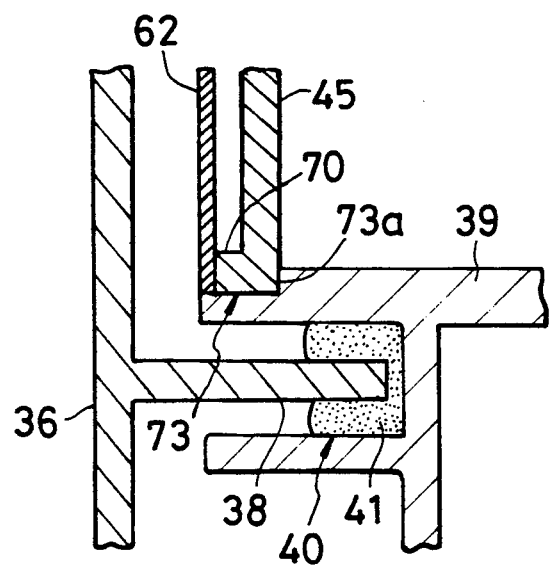
FIG. 22 is a sectional view showing that portion of the fourth lighting device where no claw for engaging a housing is seen.
Figure 23:
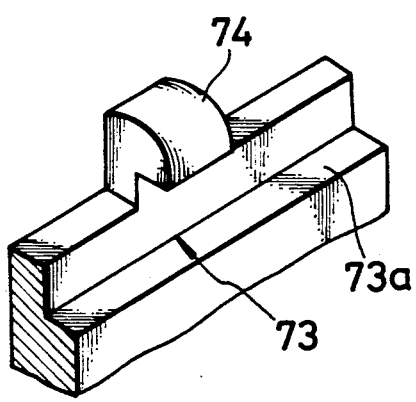
FIG. 23 is a perspective view showing an engaging claw employed by the third lighting device.

FIGS. 21 through 23 show a fourth embodiment of the present invention. According to this lighting device, the grooves 40 are formed along the outer rim of the housing 39, the legs 38 of the outer lens 36 are inserted into the grooves 40, and the hot melt 41 is injected into the grooves 40, as shown in FIGS. 21 and 22. The outer lens 36 is thus fixed to the housing 39.

The inner lens 45 has the seats 70 on both longitudinal sides thereof and the decorative transparent sheet 62 on which the graduation pattern has been printed is bridged over these two seats 70 of the inner lens 45. The sheet 62 is attached not to the inner lens 45 but to the housing 39 while being overlapped the inner lens 45. The sheet 62 may be welded to the inner lens 45.

Those portions of the housing 39 with which the inner lens 45 and the sheet 62 are contacted are cut away to form steps 73 and are provided with engaging claws 74 which are made of synthetic resin and which serve as holder means cooperating with the vertical portions 73a of the steps 73 to hold the inner lens 45 and the sheet 62 while keeping these inner lens 45 and sheet 62 contacted with the steps 73.

When the inner lens 45 is attached to the housing 39 as shown in FIG. 8, these engaging claws 74 are present mainly along the straight portion of the lens 45 but only at the end in the case of the curved portion of the lens 45.

The sheet 62 is connected to the inner lens 45 as shown in FIG. 15.

When the lighting device for use with vehicles has the above-described arrangement, the inner lens 45 and the sheet 62 are attached to the housing 39 in such a way that they are contacted with the steps 73 and held by the engaging claws 74, and the outer lens 36 is also attached to the housing 39 in such a way that its legs 38 are embedded into the hot melt 41 in the grooves 40 of the housing 39.

The inner lens 45 can be thus attached to the housing 39 without using any hot melt, thereby enabling this attaching of the inner lens 45 to be made extremely simple.

The hot melt 41 into which the legs 38 of the outer lens 36 are embedded is covered by a decorative member such as the lace and can be kept invisible from outside.

A variation of the fourth embodiment will be described below.

Figure 24:
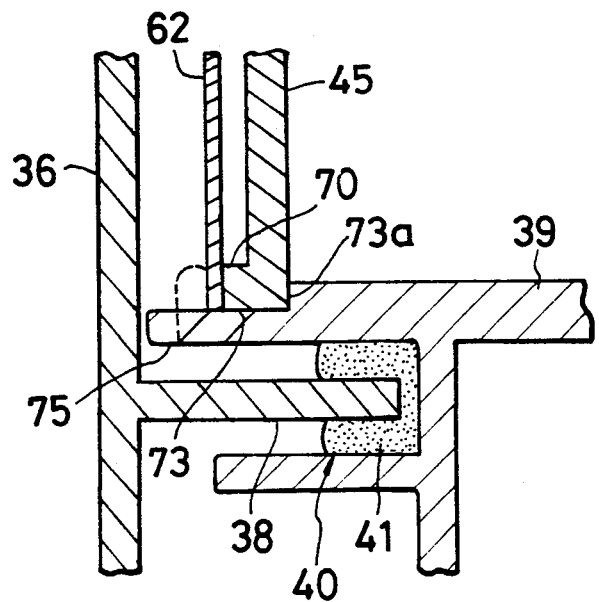
FIG. 24 is a sectional view showing the main portion of a variation of the third lighting device.
Figure 25:
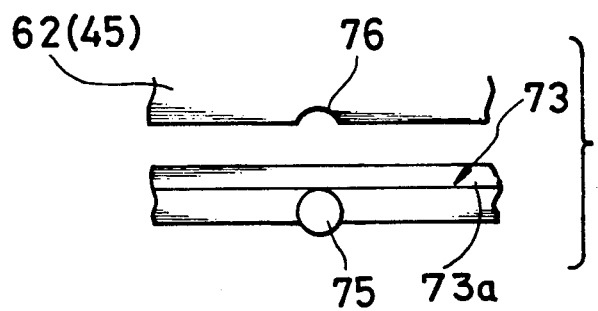
FIG. 25 is a side view showing an engaging pin and its vicinity in FIG. 24.

This variation has substantially the same overall arrangement as that of the fourth embodiment. As shown in FIGS. 24 and 25, engaging pins 75 made of synthetic resin are provided instead of the engaging claws 74 of the fourth embodiment to serve as means for holding the inner lens 45 and the sheet 62.

The inner lens 45 and the sheet 62 are provided with recesses 76 which engage with the engaging pins 75, as shown in FIG. 25. Each of the engaging pins 75 is caulked to hold the inner lens 45 and the sheet 62 and to serve as a guide rod for guiding each of the recesses 76, as shown by a broken line in FIG. 24.

According to the variation of the lighting device having the above-described arrangement, the inner lens 45 and the decorative transparent sheet 62 can be attached to the housing 39 in such a way that they are contacted with the steps 73 while keeping their recesses 76 engaged with the engaging pins 75 and that the engaging pins 75 are heat-caulked as shown by the broken line in FIG. 24. The outer lens 36 is also attached to the housing 39 by embedding its legs 38 into the hot melt 41 in the grooves 40 of the housing 39.

This variation of the lighting device for use with vehicles can thus achieve the same effect as in the case of the fourth embodiment.

Figure 26:
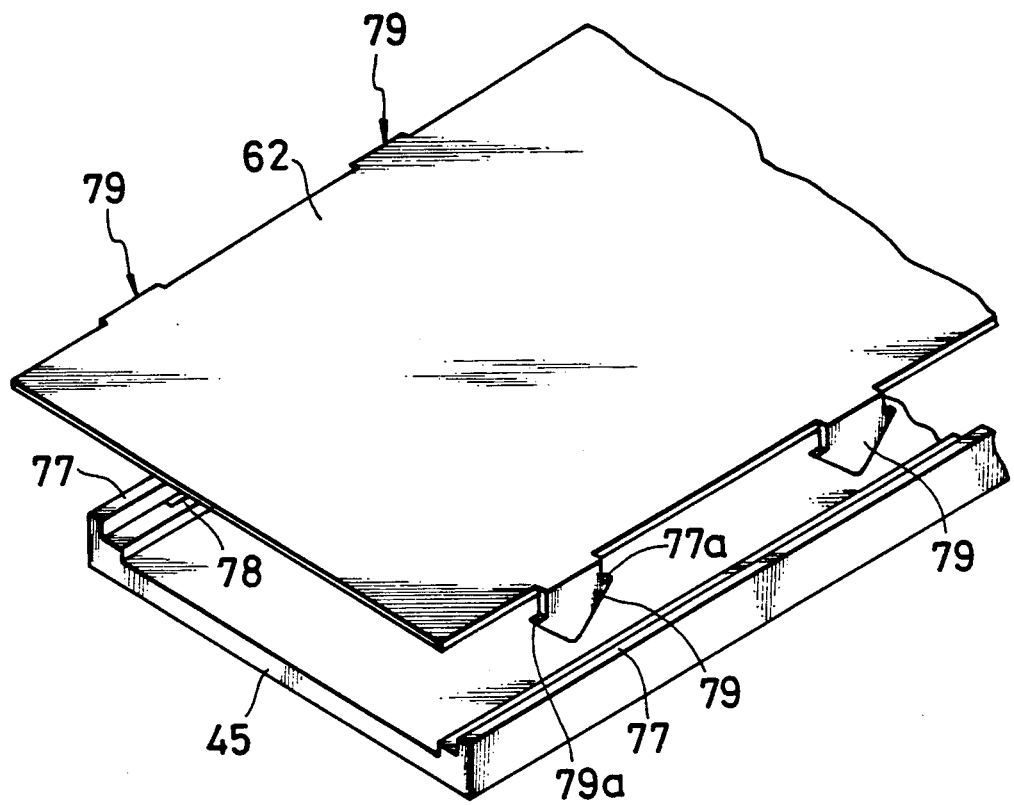
FIG. 26 is a sectional view showing the main portion of a fifth lighting device for use with vehicles according to the present invention.
Figure 27:
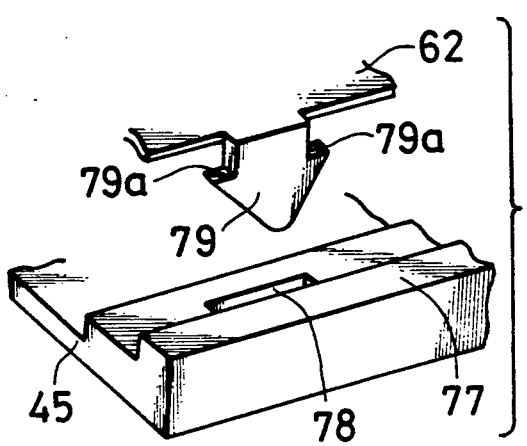
FIG. 27 is a perspective view showing the main portion of the fifth lighting device in FIG. 26.
Figure 28:
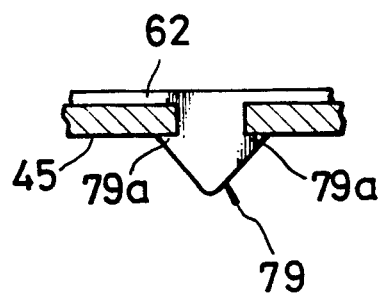
FIG. 28 is a sectional side view showing the main portion of the fifth lighting device in FIG. 27.

FIGS. 26 through 28 show a fifth embodiment of the present invention. As is apparent from FIGS. 26 through 28, seats 77 are formed along both longitudinal sides of the inner lens 45 and plural engaged holes 78 are formed in the seats 77 at a certain interval. Those portions of the sheet 62 which correspond to the holes 78 of the seats 77 are provided with claws 79. Each of the claws 79 is shaped like an arrow having a pair of engaging projections 79a on both sides thereof. When each of the claws 79 is inserted into its corresponding one of the holes 78, its engaging projections 79a are stopped by the inner side of the inner lens 45, as shown in FIG. 28, and the sheet 62 can be thus supported by the inner lens 45.

When the inner lens 45 is attached to the housing 39 as shown in FIG. 15, the engaged holes 78 are present mainly along the straight portion of the inner lens 45 but only at the end in the case of the curved portion thereof. The end of the curved portion of the inner lens 45 is provided with an erected portion 45a which has an engaged hole 67. This engaged hole 67 is tapered as shown in FIG. 16, and when an engaging projection formed integral to the sheet 62 and shaped to meet the engaged hole 67 is fitted into the engaged hole 67, one end of the sheet 62 is attached to the inner lens 45.

The decorative transparent sheet 62 of the lighting device having the above-described arrangement can be attached to the inner lens 45 by fitting its claws 79 into the holes 78 of the inner lens 45 while keeping the engaging projections 79a of its claws 79 stopped by the inner side of the inner lens 45.

Therefore, this attaching of the decorative transparent sheet 62 to the inner lens can be made in an easy, quick and reliable manner.

Figure 29:
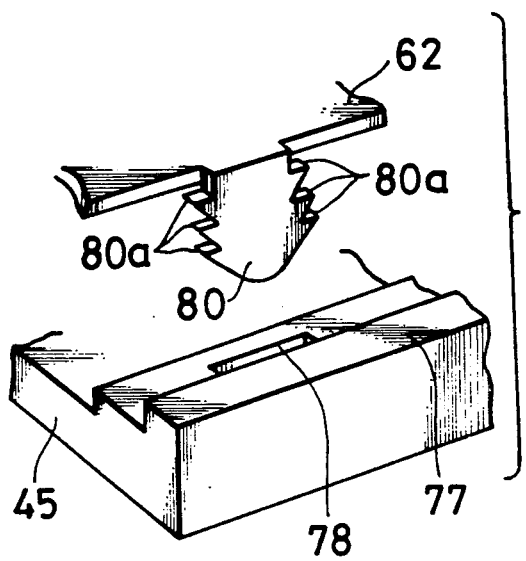
FIG. 29 is a perspective view showing the main portion of a sixth lighting device for use with vehicles according to the present invention.
Figure 30:
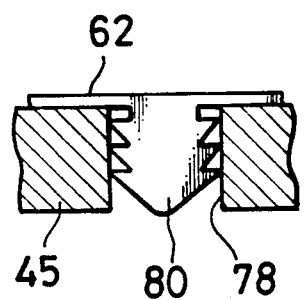
FIG. 30 is a sectional side view showing the main portion of the sixth lighting device in FIG. 29.

In the case of a sixth embodiment of the present invention shown in FIGS. 29 and 30, the seats 77 and the engaged holes 78 formed in the seats 77 are the same as those of the fifth embodiment, but claws 80 are different from those of the latter. Each of the claws 80 has plural engaging steps 80a on both sides thereof, and the width of the paired steps 80a is made a little larger than that of the engaged hole 78.

The decorative transparent sheet 62 is attached to the inner lens 45 by forcing its claws 80 into the engaged holes 78 while keeping the engaging steps 80a of the claws 80 pressed against the inner wall of the engaged holes 78. This sixth embodiment of the present invention can thus achieve the same effect as in the case of the fifth embodiment.

A seventh embodiment of the present invention will be described below.

Figure 31:
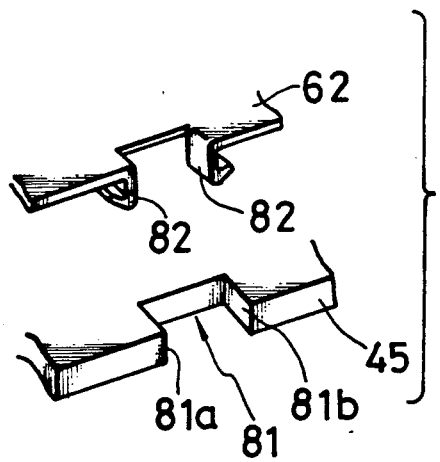
FIG. 31 is a perspective view showing the main portion of a seventh lighting device for use with vehicles according to the present invention.
Figure 32:
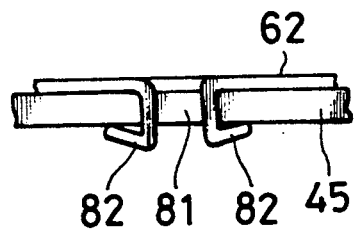
FIG. 32 is a side view showing the main portion of the seventh lighting device in FIG. 31.
Figure 33:
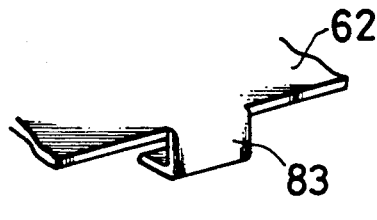
FIG. 33 is a perspective view showing the main portion of an eighth lighting device for use with vehicles according to the present invention.

As shown in FIGS. 31 and 32, the inner lens 45 has none of such seats as seen in the case of the fifth embodiment, but those portions of both longitudinal sides of the lens 45 which correspond to the engaged holes 78 of the lens 45 in the case of the fifth embodiment are provided with recesses 81. On the other hand, those portions of the sheet 62 which correspond to the recesses 81 of the inner lens 45 are provided with claws 82, which are contacted with both opposed side walls 81a and 81b of the recess 81 and are stopped by the inner side of the inner lens 45.

The decorative transparent sheet 62 can be attached to the inner lens 45 by forcing its claws 82 into the recesses 81 to be stopped by the inner side of the inner lens 45. This seventh embodiment can thus achieve the same function and effect as those of the fifth embodiment.

Figure 34:
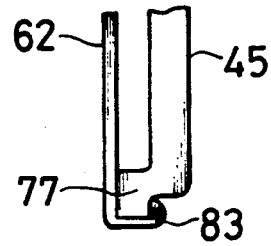
FIG. 34 is a side view showing an example of the bent portion employed in the lighting device shown in FIG. 33.
Figure 35:
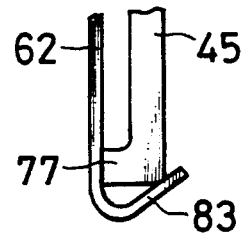
FIG. 35 is a side view showing another example of the bent portion employed in the lighting device shown in FIG. 33.
Figure 36:
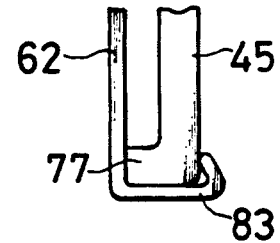
FIG. 36 is a side view showing a further example of the bent portion employed in the lighting device shown in FIG. 33.

In the case of an eighth embodiment shown in FIGS. 33 through 36, the inner lens 45 has no hole, but does have seats 77. The sheet 62 has bent pieces 83 instead of the claws 79 of the fifth embodiment on both sides thereof. This bent piece 83, formed integral to the sheet 62, can have various shapes, as shown in FIGS. 34 through 36, and it must be bent in any case to reliably hold the inner lens 45.

The sheet 62 can be attached to the inner lens 45 by holding the latter at the both sides and inner face thereof by means of the bent pieces 83. The eighth embodiment can thus achieve the same function and effect as those of the fifth one.

Figure 37:
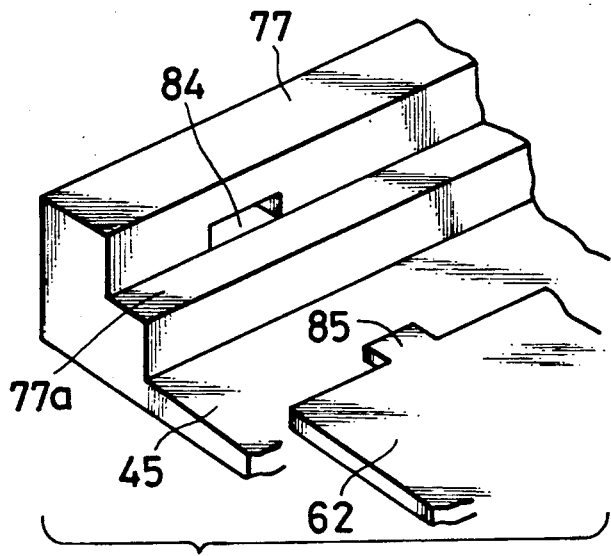
FIG. 37 is a perspective view showing the main portion of a ninth lighting device for use with vehicles according to the present invention.
Figure 38:
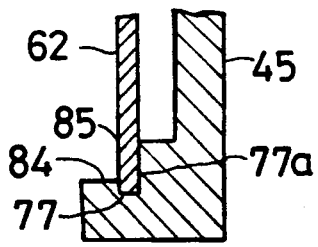
FIG. 38 is a vertically sectioned view showing a claw of the sheet in FIG. 37 fitted.
Figure 39:
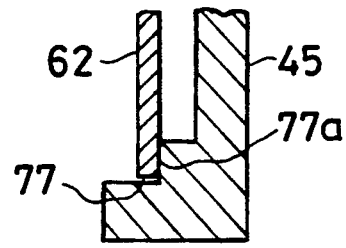
FIG. 39 is a vertically sectioned view showing that portion of the ninth lighting device where no sheet claw in FIG. 37 is present.

In the case of a ninth embodiment shown in FIGS. 37 through 39, the inner lens 45 has the same seats 77 as those in the case of the fifth embodiment, but it is different from the one in the fifth embodiment in that each of its holes 84 is directed outward in the horizontal portion of the step and parallel to the plane of the inner lens 45. The holes 84 are blind, i.e., not passing through but extending to some extent in the horizontal portion of the step on the seats 77.

The sheet 62 has claws 85 at those positions thereof which correspond to the holes 84 of the inner lens 45.

The sheet 62 can be attached to the inner lens 45 when its claws 85 are fitted into the holes 84 of the inner lens 45, as shown in FIG. 38. Side rims of the sheet 62 are placed on the vertical portion 77a of the step on the seats 77 at those portions of the sheet 62 where no claw 85 is located.

The ninth embodiment can thus achieve the same function and effect as those in the fifth one.

Figure 40:
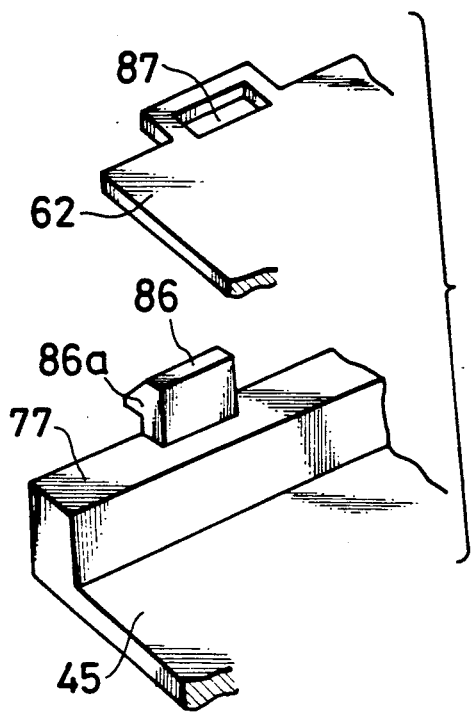
FIG. 40 is a perspective view showing the main portion of a tenth lighting device for use with vehicles according to the present invention.
Figure 41:
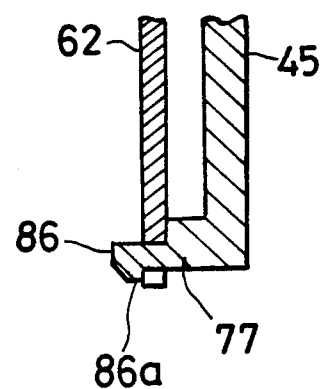
FIG. 41 is a vertically sectioned view showing the tenth lighting device in FIG. 40.

In the case of a tenth embodiment of the present invention shown in FIGS. 40 and 41, the top of each of the seats 77 on both sides of the inner lens 45 is made flat, and claws 86 are erected from the flat top of each of the seats 77 and the sheets 62 has holes 87 at those portions thereof which correspond to the claws 86 on the seats 77 of the inner lens 45.

When the claws 86 of the inner lens 45 are fitted into the holes 87 of the sheet 62, an engaging tip 86a of each of the claws 86 is engaged with the sheet 62, as shown in FIG. 41, to reliably attach the sheet 62 to the inner lens 45.

This tenth embodiment can thus achieve the same function and effect as those in the case of the fifth one.

Figure 42:
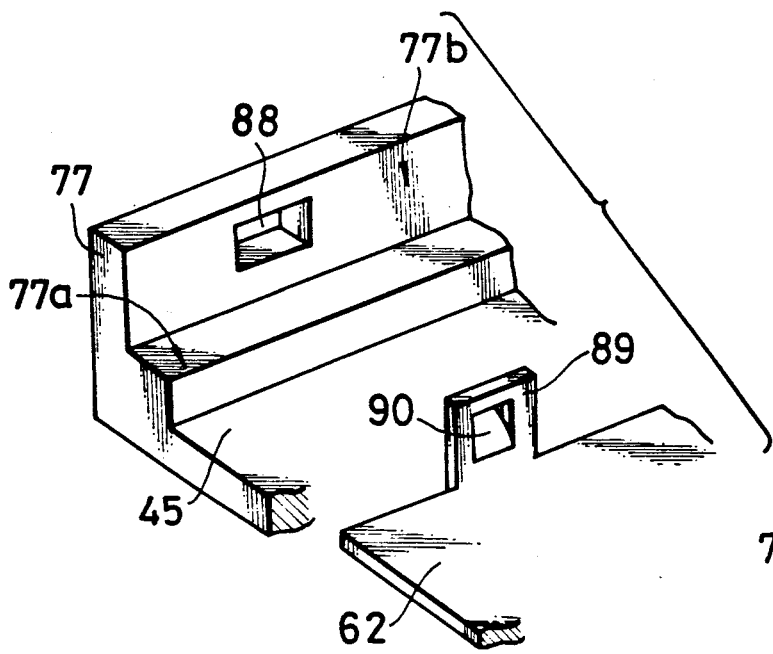
FIG. 42 is a perspective view showing the main portion of an eleventh lighting device for use with vehicles according to the present invention.
Figure 43:
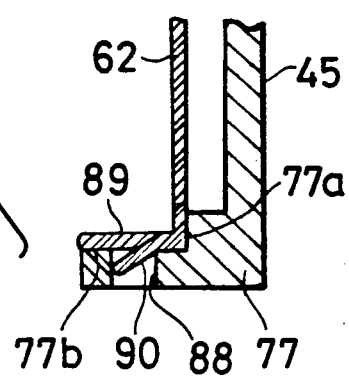
FIG. 43 is a vertically sectioned view showing the eleventh lighting device in FIG. 42.

In the case of an eleventh embodiment of the present invention shown in FIGS. 42 and 43, holes 88 are formed in the horizontal portion 77b of the step on the seat 77 along each of both longitudinal sides of the inner lens 45, directed outward and parallel to the plane of the inner lens 45, as seen in the case of the ninth embodiment. These holes 88 pass through the horizontal portion 77a of the step on the seat 77.

Those portions of the sheet 62 which correspond to the holes 88 of the inner lens 45 are provided with erected pieces 89, to each of which a U-like cut is applied to form a U-like tongue 90 bent toward the hole 88.

As shown in FIG. 43, the sheet 62 is attached to the inner lens 45 in such a way that the former is contacted with the vertical portions 77a of the steps on the seats 77, and its erected pieces 89 are also contacted with the horizontal portions 77b of the steps on the seats 77 while keeping the U-like tongues 90 of the erected pieces 89 engaged with the holes 88.

Figure 44:
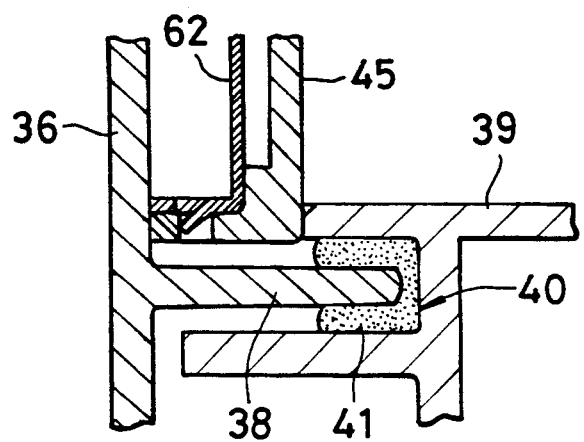
FIG. 44 is a sectional view showing how the inner lens and the decorative transparent sheet in FIG. 42 are arranged between the outer lens and the housing.
Figure 45:
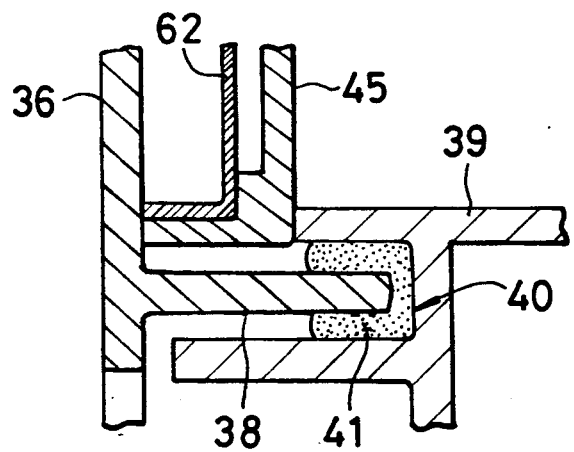
FIG. 45 is a sectional view showing that portion of the eleventh lighting device where no engaging means in FIG. 44 is present.

The inner lens 45 to which the sheet 62 has been attached is contacted with the housing 39 and is then sandwiched between the housing 39 and the outer lens 36 which is embedded into the hot melt 41 in the grooves 40 of the housing 39, as shown in FIGS. 44 and 45. The inner lens 45 can be thus fixed and supported between the housing 39 and the outer lens 36 without using any specific fixing means.

The attaching of the transparent sheet to the inner lens has been variously embodied as the second through eleventh embodiments of the present invention.

The attaching of the inner and outer lenses to the housing will be described citing some embodiments thereof.

Figure 46:
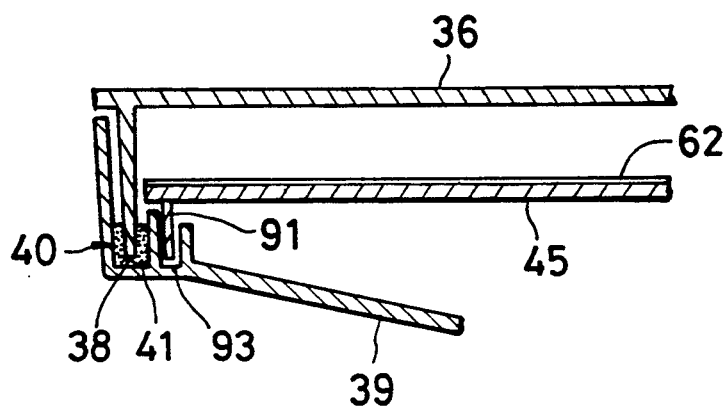
FIG. 46 is a sectional view showing the main portion of an end of a twelfth lighting device for use with vehicles according to the present invention.
Figure 47:
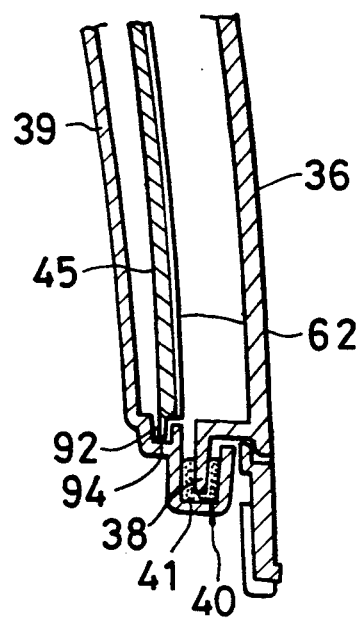
FIG. 47 is a sectional view showing the main portion of the other end of the twelfth lighting device.

FIGS. 46 and 47 show a twelfth embodiment of the present invention wherein the attaching of the inner and outer lenses to the housing has been improved. This example of the lighting device for use with vehicles has an overall arrangement such as the one shown in FIGS. 7 through 11 and described above. As shown in FIGS. 46 and 47, both ends of the inner lens 45 have legs 91 and 92 directed toward the housing 39. One leg 91 is right-angled relative to the inner lens 45 while the other 92 is directed parallel to the lens 45. These legs 91 and 92 are also arranged relative to the inner lens 49 for the turn signal lamp 32 in same manner as they are arranged relative to the inner lens 45.

Those portions of the housing 39 which correspond to the legs 91 and 92 of the lens 45 are provided with grooves 93 and 94, which are located inside the grooves 40 of the housing 39 to receive the legs 91 and 92. Widths of these grooves 93 and 94 are made a little larger than thicknesses of the legs 91 and 92 so that the grooves 93 and 94 can easily receive the legs 91 and 92.

In the case of the inner lens 45 having the above-described arrangement, the sheet 62 is engaged with the engaging claws 60 and 61 of the inner lens and the legs 91 and 92 of the lens 45 are then inserted into the grooves 93 and 94 of the housing 39, flexing the whole of the inner lens 45. When the inner lens 45 is left like this, outer faces of the legs 91 and 92 are pressed against outer walls of the grooves 93 and 94 due to the resilience of the inner lens 45, so that the inner lens 45 can be attached to the housing 39 by frictional force between the outer faces of the legs 91, 92 and the outer walls of the grooves 93, 94.

The sheet 62 is not attached to the inner lens 49 for covering the lamp chamber 43 of the turn signal lamp 32. The legs 91 and 92 of the inner lens 49 are inserted into the grooves 93 and 94, flexing the whole of the inner lens 49. The inner lens 49 can be thus attached to the housing 39.

The outer lens 36 is attached to the housing 39 by embedding the legs 38 of the lens 36 into the hot melt 41 in the grooves 40 of the housing 39.

Therefore, the attaching of the inner lenses 45 and 49 to the housing 39 can be made extremely easy to thereby enhance the assembly efficiency of the lighting device to a greater extent.

Figure 48:
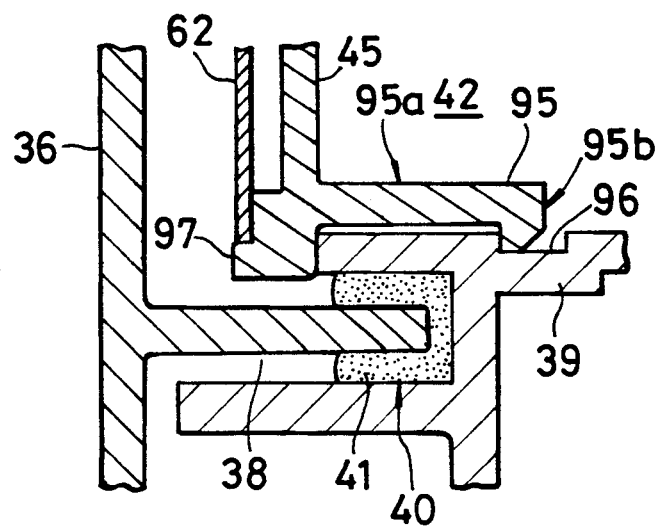
FIG. 48 is a sectional view showing the main portion of a thirteenth lighting device for use with vehicles according to the present invention.
Figure 49:
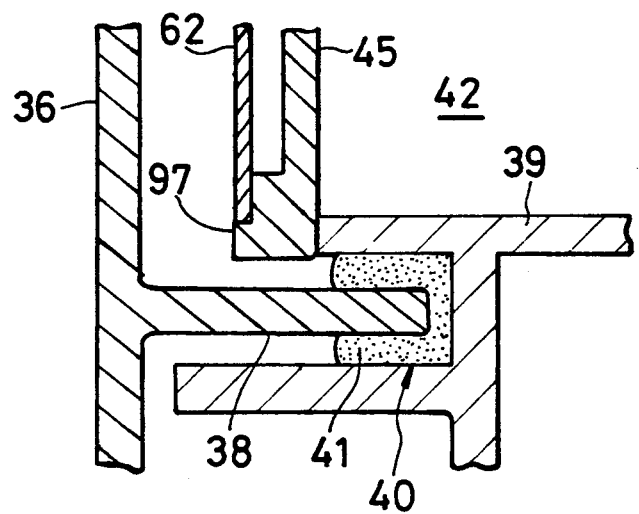
FIG. 49 is a sectional view showing that portion of the thirteenth lighting device where no engaging means in FIG. 48 is present.

FIGS. 48 and 49 show a thirteenth embodiment of the present invention wherein the attaching of the inner and outer lenses to the housing has been improved. FIGS. 48 and 49 are sectional views showing the border of the lamp chamber 42 for the tail stop lamp 31 with the lamp chamber 43 for the turn signal lamp 32 or lamp chamber 44 for the backup lamp 33.

The housing 39 has the groove 40 along the rim thereof and the leg 38 formed along the rim of the outer lens 36 is inserted into the groove 40 and fixed there by the hot melt 41.

Plural engaging pieces 95 are provided at a certain interval on both longitudinal sides of the inner lens 45 located inside the outer lens 36. Each of the engaging pieces 95 includes a leg 95a made integral to the inner lens 45 and separated a little from the housing 39, and an engaging claw 95b made integral to the leg 95a and engaged with a recess 96 of the housing 39. The inner lens 45 provided with the engaging pieces 95 is made of synthetic resin or the like. The engaging pieces 95 are arranged on both longitudinal sides of the inner lens 45 at a certain interval and those portions of the inner lens 45 on both longitudinal sides thereof where no engaging piece 95 is present are only mounted on the housing 39, as shown in FIG. 49.

The engaging pieces 95 which are arranged on both longitudinal sides of the inner lens 45 at a certain interval may be present over the whole length of the inner lens 45 or they may be present mainly along the straight portion of the lens 45 but only at the end along the curved portion thereof when the inner lens 45 is attached to the housing 39 as shown in FIG. 9.

The decorative transparent sheet 62 on which the graduation pattern has been printed is attached to seats 97 of the inner lens 45 at the straight portion thereof by welding or engaging claws and engaged holes. The sheet 62 is also attached to the inner lens 45 at the curved portion thereof in such manner as shown in FIG. 15 and described above.

The inner lens 45 having the above-described arrangement is attached to the housing 39 by forcing its engaging pieces 95 into the housing 39 and engaging its engaging claws 95b with the engaged recesses 96 of the housing 39.

The inner lens 45 can be thus attached to the housing 39 with easiness and reliability.

The engaging pieces 95 are separated from the housing 39 by a certain interval. Those forces which are applied to the inner lens 45 because of slight dimensional errors and torsion of the housing 39 can be therefore absorbed by the transformation of the resilient engaging pieces 95. This prevents the inner lens 45 and the sheet 62 from being curved. This also prevents the sheet 62 from peeling off from the inner lens 45.

Although the present invention has been described citing its preferred embodiments, it should be understood that various changes and modifications can be made without departing from the spirit and scope of the present invention.

I claim:

1. A lighting device for use with vehicles comprising:
    a housing having a front opening;
    an outer lens attached to the front opening of the housing;
    an inner lens located between the outer lens and the front opening of the housing and having an outer surface facing an inner surface of said outer lens;

a transparent sheet attached to the outer surface of the inner lens and having an outer surface facing the outer lens, the entire outer surface of the sheet being uniformly delustered to diffuse light from the outside of the lighting device through the outer lens; and at least one light source located within said housing and facing the inner surface of said inner lens.

2. A lighting device for use with vehicles according to claim 1, wherein at least one of the outer lens and the inner lens is provided with engaging pins, while the transparent sheet is provided with engaged holes into which the engaging pins of the outer of inner lens are fitted.

3. A lighting device for use with vehicles according to claim 1, wherein the housing as a groove along its rim into which a leg formed along the rim of the outer lens is embedded, and the transparent sheet has claws for supporting the inner lens at both sides thereof and legs by which it is fixed to the housing, supporting the inner lens by its claws.

4. A lighting device for use with vehicles according to claim 1, wherein the housing has holder devices projecting outward from both longitudinal sides thereof which hold both of the inner lens and the transparent sheet at both longitudinal sides thereof.

5. A lighting device for use with vehicles according to claim 4, wherein said holder means are pins made of synthetic resin and both of the inner lens and the transparent sheet are fixed to the housing by caulking these pins of the housing.

6. A lighting device for use with vehicles according to claim 1, wherein the inner lens has engaging holes formed along both longitudinal sides thereof at a certain interval and the transparent sheet has wedge-like engaged projections formed along both longitudinal sides thereof to meet corresponding engaging holes of the inner lens, and wherein when the wedge-like engaged projections of the sheet are engaged with the engaging holes of the inner lens, both of the inner lens and the transparent sheet are combined with each other.

7. A lighting device for use with vehicles according to claim 6, wherein each of the wedge-like engaged projections of the transparent sheet is toothed like a saw at both sides thereof.

8. A lighting device for use with vehicles according to claim 1, wherein the housing has outer and inner grooves formed along its open front and the outer lens has a leg formed along its rim and the inner lens has legs formed along both longitudinal sides thereof, and when the leg of the outer lens is embedded into the outer groove of the housing and the legs of the inner lens into the inner groove thereof, both of the outer and inner lenses are fixed to the housing.

9. A lighting device for use with vehicles according to claim 8, wherein each of the legs of the inner lens is pressed against and fixed to the side wall of the inner groove of the housing.

10. A lighting device for use with vehicles according to claim 1, wherein the housing has engaging recesses formed along and separated from the open rim thereof by a certain distance while the inner lens has pieces formed along its both longitudinal sides, extending inside the housing, and when the pieces of the inner lens are engaged with the engaging recesses of the housing, the inner lens is fixed to the housing.

11. The lighting device according to claim 1, wherein said outer lens is formed from acryl resin.

12. The lighting device according to claim 1, wherein said inner lens comprises a fish-eye prism on the outer surface thereof, and a fresnel prism on an inner surface thereof.

13. The lighting device according to claim 12, wherein said inner lens is formed from a colorless transparent acryl resin.

14. The lighting device according to claim 12, wherein said inner lens is about 3 millimeters thick.

15. The lighting device according to claim 1, wherein said transparent sheet is formed from polycarbonate resin.

16. The lighting device according to claim 15, wherein said transparent sheet is about 0.5 millimeters thick.

17. The lighting device according to claim 1, wherein said transparent sheet is delustered by use of ink.

18. The lighting device according to claim 1, wherein said transparent sheet is delustered by a liquid honing process.

19. The lighting device of claim 1, further comprising a graduation pattern printed in black ink on the outer surface of said transparent sheet.

20. A lighting device for use with vehicles comprising:

a housing having a front opening;

an outer lens attached to the front opening of the housing;

an inner lens located between the outer lens and the front opening of the housing and having an outer surface facing an inner surface of said outer lens;

a transparent sheet attached to the outer surface of the inner lens and having an outer surface facing the outer lens, the entire outer surface of the sheet being uniformly delustered to diffuse light from the outside of the lighting device through the outer lens;

at least one light source located within said housing and facing the inner surface of said inner lens; and a reflex reflector located in a recess formed in the inner lens.

21. The lighting device according to claim 20, wherein the reflex reflector comprises a frame which serves as a light transmitting section, and a plurality of rows of element blocks which are attached to the frame along a longitudinal direction of the reflex reflector, each row having a plurality of element blocks.

22. The lighting device according to claim 21, wherein said recess is formed with a separate ventilation hole and a separate seat for at least one of said element blocks, and wherein said ventilation hole and said seat are located in an effective illumination area of said element block.

23. A lighting device for use with vehicles comprising:

a housing having a front opening;

an outer lens attached to the front opening of the housing;

an inner lens located between the outer lens and the front opening of the housing and having an outer surface facing an inner surface of said outer lens;

a transparent sheet which is ultrasonically deposited on the outer surface of the inner lens and which has an outer surface facing the outer lens, the entire outer surface of the sheet being uniformly delustered to diffuse light from the outside of the lighting device through the outer lens; and at least one light source located within said housing and facing the inner surface of said inner lens.

* * * * *